(12) United States Patent  (10) Patent No.: US 8,832,125 B2
Boctor  (45) Date of Patent: Sep. 9, 2014

(54) EXTENSIBLE EVENT-DRIVEN LOG ANALYSIS FRAMEWORK

(75) Inventor: Victor William Habib Boctor, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 593 days.

(21) Appl. No.: 12/814,495

(22) Filed: Jun. 14, 2010

(65) Prior Publication Data

US 2011/0307502 A1 Dec. 15, 2011

(51) Int. Cl.
*G06F 17/30* (2006.01)

(52) U.S. Cl.
USPC .......................................................... 707/758

(58) Field of Classification Search
CPC ............ G06F 11/3476; G06F 11/3636; G06F 21/121; G06F 21/552; G06F 21/566; G06F 8/37; G06F 8/41
USPC .................................. 707/754, 793, 804, 758
See application file for complete search history.

(56) References Cited

U.S. PATENT DOCUMENTS

| | | | |
|---|---|---|---|
| 6,144,967 A | 11/2000 | Nock | |
| 6,789,115 B1 | 9/2004 | Singer et al. | |
| 7,058,928 B2 * | 6/2006 | Wygodny et al. | 717/128 |
| 7,743,030 B1 * | 6/2010 | Korolev et al. | 707/648 |
| 7,822,850 B1 * | 10/2010 | Brikman et al. | 709/224 |
| 7,849,363 B2 * | 12/2010 | Mochizuki et al. | 714/26 |
| 8,266,159 B2 * | 9/2012 | Torres | 707/752 |
| 8,381,193 B2 * | 2/2013 | Cervantes | 717/131 |
| 2004/0254919 A1 * | 12/2004 | Giuseppini | 707/3 |
| 2006/0184529 A1 * | 8/2006 | Berg et al. | 707/8 |
| 2007/0204215 A1 * | 8/2007 | Mueller et al. | 715/514 |
| 2007/0239799 A1 * | 10/2007 | Modi | 707/202 |
| 2008/0134214 A1 * | 6/2008 | Goswami et al. | 719/318 |
| 2008/0155548 A1 * | 6/2008 | Dettinger et al. | 718/102 |
| 2009/0013007 A1 | 1/2009 | Caner | |
| 2009/0070455 A1 * | 3/2009 | Cervantes | 709/224 |
| 2009/0070601 A1 * | 3/2009 | Boxmeyer | 713/193 |
| 2011/0154117 A1 * | 6/2011 | Danielson et al. | 714/37 |
| 2011/0191394 A1 * | 8/2011 | Winteregg et al. | 707/822 |

OTHER PUBLICATIONS

"Exchange Log Analyzer", Retrieved at << http://www.server-management.co.uk/features/Exchange_Log_Analyzer >>, Version 3, Retrieved Date: Apr. 12, 2010, pp. 3.
"Web Filter or Log Analyzer for ISA Server", Retrieved at << http://www.wavecrest.net/isaserver/ >>, Retrieved Date: Apr. 12, 2010, p. 1.
"10-Strike Log-Analyzer 1.5", Retrieved at << http://www.qweas.com/download/web/log_analyzers/10_strike_log_analyzer.htm >>, Version 1.5, Retrieved Date: Apr. 12, 2010, pp. 2.

(Continued)

*Primary Examiner* — Debbie Le
(74) *Attorney, Agent, or Firm* — Louise Bowman; Jim Ross; Micky Minhas (57) ABSTRACT

A log analysis framework is provided that includes a core that is configured to support the execution of one or more extensions and one or more analyzers. The core provides a common infrastructure, base classes, and utilities for supporting the execution of the extensions and the analyzers. Extensions are software components configured to parse a log file and to trigger events based upon the contents of the log file. Analyzers are executable software components configured to consume events generated by the extensions, to analyze the events, and to generate a report based on the events.

17 Claims, 9 Drawing Sheets

(56) References Cited

OTHER PUBLICATIONS

"GFi EventsManager:Event monitoring, management and archiving", 2010, Retrieved Apr. 12, 2010 at << http://www.manageengine.com/products/eventlog/ >>, pp. 3.

"ExLogAnalyzer", Retrieved at << http://code.msdn.microsoft.com/ExLogAnalyzer >>, Jun. 8, 2010, pp. 4.

Key, Jeff., "Snippet Compiler", Retrieved at << http://www.sliver.com/dotnet/SnippetCompiler/ >>, Aug. 22, 2003, p. 1.

GFi EventsManager, brochure, 2008, retrieved Apr. 12, 2010, from http://www.gfi.com/eventsmanager/esmbrochure.pdf, 3 pages.

* cited by examiner

EXTENSIBLE EVENT-DRIVEN LOG ANALYSIS FRAMEWORK

BACKGROUND

Many types of computer programs create and maintain log files. Log files provide a record of activities that have occurred with respect to the program that creates the log file. For instance, an electronic mail ("e-mail") server application might maintain a log file that contains data describing the connections made to and from the server, the success or failure of messages sent to and from the server, and other information regarding the operation of the server. Other types of programs might also maintain log files containing relevant information regarding their operation.

Large distributed computing systems may maintain many different log files. For instance, a large distributed computing system might include multiple server computers running multiple different processes for performing various functions. Each of the processes might maintain a log file that has a format that is different from the format of the log files maintained by the other processes. Consequently, a large distributed computing system might maintain many different log files having many different formats. These log files might also be distributed across many different server computers.

In order to analyze the contents of log files, scripts are typically created to mine interesting data from the various log files. The scripts are generally configured to parse a log file to retrieve desired data and to then perform an analysis on the parsed data to answer a question. For instance, a script might be created to determine the number of connections made to a server during a particular time period. Creating and using scripts to analyze log files in this manner, however, can be challenging due to the difficulty in creating and maintaining a large number of scripts, the complexity in reusing script code spread across a large number of scripts, and due to the lack of a central component for configuration and management of the scripts.

Another mechanism for analyzing log files involves executing a parser to extract relevant information from a log file by executing queries similar to relational database queries against the contents of the log file. This mechanism is appropriate for certain types of log files. This mechanism is not appropriate, however, for certain types of complex log files such as where the format of each line varies significantly based on the event type to which the line belongs. A state machine is typically required to analyze these types of complex log files. As a result, previous parsers may be unable to analyze these types of complex log files.

It is with respect to these and other considerations that the disclosure made herein is presented.

SUMMARY

An extensible event-driven log analysis framework is disclosed herein. In particular, a log analysis framework is provided that separates log parsing from log analysis. Through this separation, a log analysis framework extension can be created that parses a particular log file. The log analysis framework extension can be easily reused once it has been created for a particular log file type. A log analysis framework analyzer can also be created that consumes events generated by one or more log analysis framework extensions and analyzes the events, including implementing a state machine and other complex algorithms for analyzing complex log files.

According to one aspect presented herein, a log analysis framework (referred to herein as "the framework") is provided that includes a log analysis framework core (referred to herein as "the core") that is configured to support the execution of one or more log analysis framework extensions ("extensions") and one or more log analysis framework analyzers ("analyzers"). The core is configured to provide a common infrastructure, base classes, and utilities for supporting the execution of the extensions and the analyzers. The core is also configured to define global events and to provide a mechanism for configuration management. The core is also configured to provide for integration with external graphing engines and parsing engines. The core can also detect the available extensions and analyzers at runtime, thereby permitting extensions to be added to the framework without re-compilation of the core.

According to another aspect, one or more extensions are provided for use with the framework. The extensions are software components configured to parse a log file and to trigger events based upon the contents of the log file. Each event might include one or more arguments that include detailed information regarding the event. One extension is typically provided per type of log file. In this manner, a single extension can be created for parsing a particular type of log file and utilized by many different analyzers. An extension might also define global events for a particular log file type and define sessions and events associated with a session.

According to another aspect, one or more analyzers are provided for use with the framework. The analyzers are executable software components configured to consume the events generated by the extensions, to analyze the events, and to generate a report based on the events. The analyzers can be created in an object-oriented programming language, thereby permitting the creation of state machines and other complex analysis algorithms. One analyzer is typically provided for each type of report. The analyzers may be compiled at runtime by the framework, thereby permitting the analyzers to be created and modified without requiring the installation of a development environment. Analyzers may be configured to analyze events generated from one or more log files generated by multiple distributed computing systems and to process a multitude of different log file types.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to concepts and technologies for an extensible event-driven log analysis framework. In particular, a log analysis framework is provided that separates log parsing from log analysis. The log analysis framework includes a core that is configured to support the execution of one or more extensions and one or more analyzers. The core provides a common infrastructure, base classes, and utilities for supporting the execution of the extensions and the analyzers. Extensions are software components configured to parse a log file and to trigger events based upon the contents of the log file. Analyzers are executable software components configured to consume events generated by the extensions, to analyze the events, and to generate a report based on the events. Additional details regarding these components will be provided below with respect to FIGS. 1-9.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system, methodology, and computer-readable storage medium for an extensible event-driven log analysis framework will be described.

Figure 1:
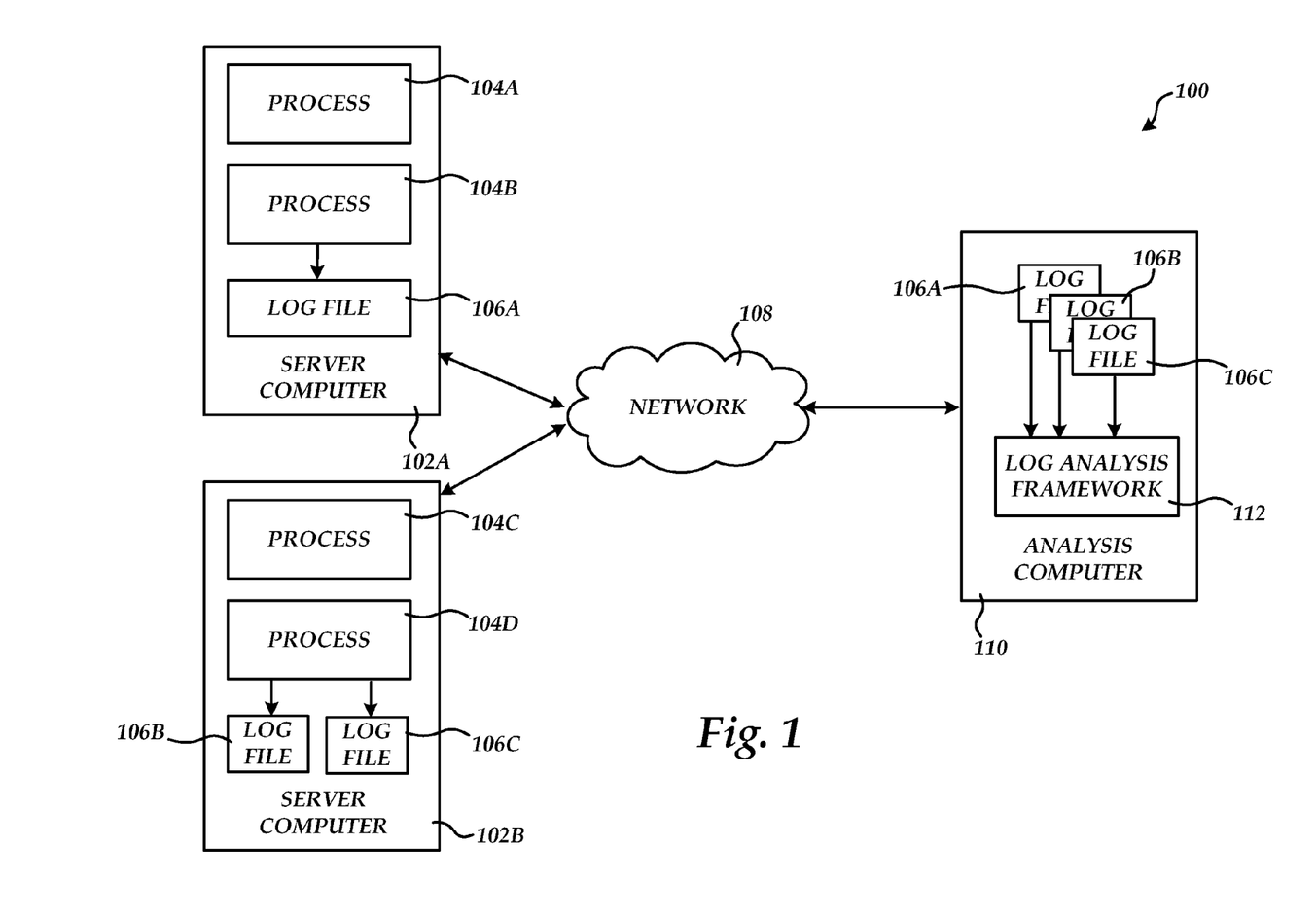
FIG. 1 is a computer network and software architecture diagram that shows aspects of an operating environment for an event-driven log analysis framework disclosed herein.

Turning now to FIG. 1, details will be provided regarding one embodiment presented herein for an extensible event-driven log analysis framework. In particular, FIG. 1 is a computer network and software architecture diagram that shows aspects of an operating environment for an event-driven log analysis framework disclosed herein. The operating environment 100 shown in FIG. 1 includes a number of server computers 102A-102B communicatively coupled by way of a network 108. In the example shown in FIG. 1, the server computer 102A is executing the processes 104A-104B and the server computer 102B is executing the processes 104C-104D. Additionally, the process 104B is generating a log file 106A. The process 104D is generating the log files 106B-106C. As discussed briefly above, the log files 106A-106C provide a record of activities that have occurred with respect to the program that creates the log file. For example, the process 104B maintains the log file 106A to provide data describing the activities that have occurred with respect to the process 104B. Because various processes might perform different functions, the contents of the log files 106A-106C may be of different types and have different formats.

It should be appreciated that although two server computers 102A-102B have been shown in FIG. 1, many other computers might be utilized by the embodiments presented herein. Moreover, it should be appreciated that the log files 106 might be created by other types of software components other than the processes 104A-104D. It should further be appreciated that a process or other type of software component may create and maintain zero or more log files 106A-106C. The log files may be stored on a single computing system, stored at a network location, distributed across multiple computing systems, or maintained in another manner. In this regard, it should be appreciated that the embodiments disclosed herein should not be limited by the manner in which the log files 106A-106C are created and stored.

As also shown in FIG. 1, an analysis computer 110 is provided in one embodiment disclosed herein. The analysis computer 110 is configured to execute a log analysis framework 112. As will be described in greater detail below, the log analysis framework 112 provides functionality for parsing and analyzing the log files 106A-106C. Through the use of the log analysis framework 112, a log analysis framework extension can be created that parses a particular type of log file. The log analysis framework extension can easily be reused once it has been created for a particular log file type. A log analysis framework analyzer can also be created that consumes events generated by one or more extensions and that analyzes the events, including implementing a state machine or other complex algorithm for analyzing complex log files. Additional details regarding these and other features of the log analysis framework 112 provided herein will be described below with reference to FIGS. 2-9.

It should be appreciated that while the log analysis framework 112 is illustrated in FIG. 1 as executing on the analysis computer 110, various components of the analysis framework 112 might also be executed at the server computers 102A-102B. It should be appreciated that the software components described herein as part of the log analysis framework 112 might be executed at the analysis computer 110, the server computers 102A-102B, or another suitable computing system.

It should also be appreciated that although FIG. 1 illustrates a single network 108, many other networks might be utilized. Additionally, as discussed briefly above, additional server computers 102A-102B, other types of computers, other analysis computers 110, and other local and distributed computing systems might also be utilized with the embodiments presented herein. It should be appreciated that the architecture illustrated in FIG. 1 is merely illustrative and should not be construed as limiting the embodiments presented herein in any way.

Figure 2:
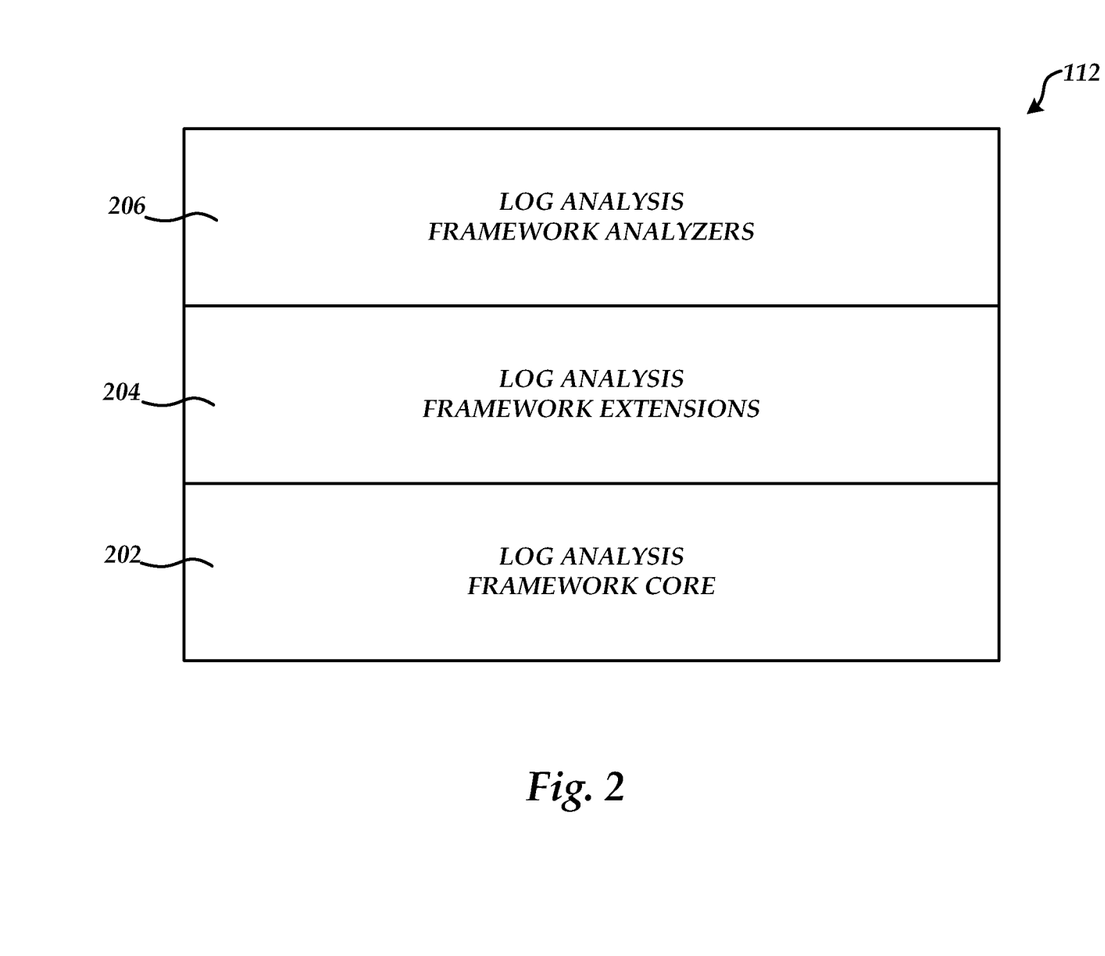
FIG. 2 is a software architecture diagram showing aspects of an event-driven log analysis framework disclosed herein in one embodiment.

Referring now to FIG. 2, a software architecture diagram will be described that shows aspects of an event-driven log analysis framework 112 disclosed herein in one embodiment. As shown in FIG. 2, the log analysis framework 112 comprises a log analysis framework core ("the core") 202, log analysis framework extensions ("extensions") 204, and log analysis framework analyzers ("analyzers") 206. As will be discussed in greater detail below, the core 202 supports the execution of the extensions 204 and the analyzers 206. In particular, according to embodiments, the core 202 is configured to provide a common infrastructure, base classes, and utilities for supporting execution of the extensions 204 and the analyzers 206. The core 202 is also configured to define global events, to provide a mechanism for configuration management, and to provide for integration with external graphing and parsing engines. It should be further appreciated that, according to embodiments, the core 202 can also detect the available extensions 204 at runtime of the core 202, thereby permitting the extensions 204 to be added to the framework 112 without recompiling the core 202. Additional details regarding the structure and operation of the core 202 will be provided below with respect to FIGS. 3-9.

As discussed briefly above, the framework 112 also includes one or more extensions 204. In general, the extensions 204 are executable software components that translate the contents of a particular type of log file into a set of events. In this manner, the extensions 204 separate the semantics of a log file from its syntax.

The events triggered by the extensions 204 might include zero or more arguments that include detailed information regarding the event. According to embodiments, one extension is provided per type of log file 106. In this manner a single extension can be created for parsing a particular type of log file and be utilized by many different analyzers 206. As will be described in greater detail herein, an extension 204 might also define global events for a particular log file type and define sessions and events associated with a particular session.

As also discussed briefly above, one or more analyzers 206 are provided for use within the framework 112. The analyzers 206 are executable software components configured to consume the events generated by the extensions 204, to analyze the events, and to generate a report based on the events. The events can be created in an object oriented programming language, such as C++ or C#, thereby permitting the creation of state machines and other complex analysis algorithms.

The analyzers may be compiled at runtime by the framework 112, thereby permitting the analyzers 206 to be created and modified without requiring the installation of a development environment. The analyzers 206 may be configured to analyze events generated from one or more log files 106A-106C generated by multiple computing systems, such as the servers 102A-102B, and to process a multitude of different log file types. One analyzer is typically provided for each type of generated report. Additional details regarding the core 202, the extensions 204, and the analyzers 206 will be provided below with respect to FIGS. 3-9.

Figure 3:
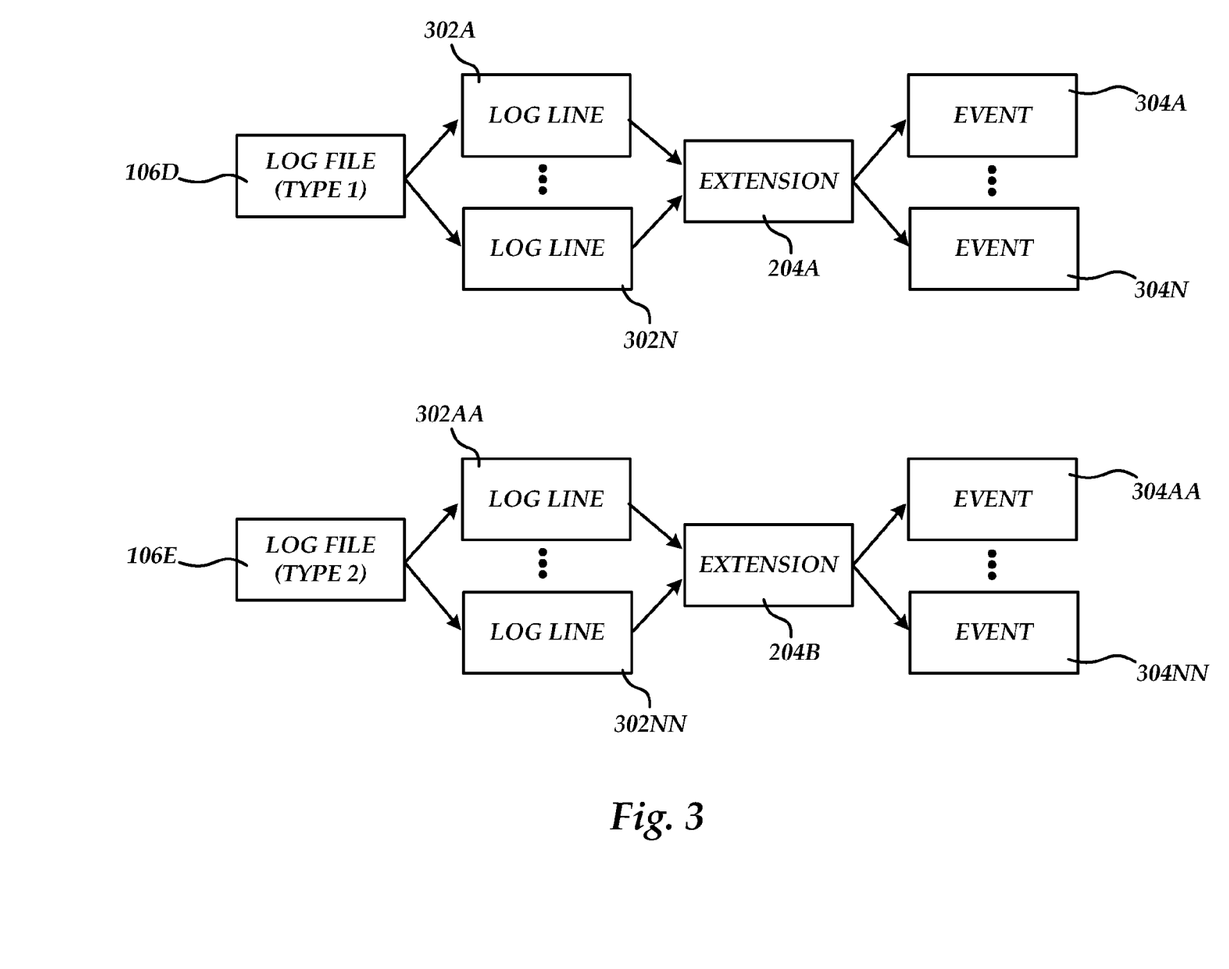
FIG. 3 is a software architecture diagram showing aspects of a log analysis framework extension according to one embodiment disclosed herein.

Referring now to FIG. 3, a software architecture diagram will be described that illustrates aspects of the operation of the extensions 204 according to one implementation disclosed herein. As discussed briefly above, a single extension 204 is typically created to parse a particular type of log file. For instance, in the example illustrated in FIG. 3, an extension 204A has been created to parse a log file 106D having a first type. Another extension 204B has been created to parse a log file 106E that has a different type than the log file 106D. As also described briefly above, the extensions 204 translate the contents and syntax of the log files 106 into a set of events. In this manner, the extensions 204 separate the semantics from the syntax of a particular log file.

According to one implementation, the extensions 204 are configured to read lines from a log file and to generate events based on each line. For instance, as shown in FIG. 3, the extension 204 reads the lines 302A-302N from the log file 106D. For each of the lines 302A-302N, the extension 204A generates an event 304 that can be consumed by the analyzers 206. In the example shown in FIG. 3, the extension 204A has generated the events 304A-304N corresponding to the lines 302A-302N. Similarly, the extension 204B has generated the events 304AA-304NN corresponding to the lines 302AA-302NN of the log file 106E.

According to one embodiment, each of the events 304 includes zero or more arguments that provide details regarding the corresponding event. For instance, if an event 304A corresponds to a log line 302A indicating that a connection between the server computers 102A-102B was established, the arguments might specify the type of connection, the network addresses of the connected computers, and other information.

It should be appreciated that the extensions 204 define the set of events 304A-304N for a particular type of log file 106. When executed, the extensions 204 also map the data contained in the corresponding log file 106 into the defined set of events 304. According to one embodiment, the events 304 derive from a set of common base classes that are defined by the core 202. Additional details regarding the operation of the extensions 204 will be provided below with respect to FIGS. 4-9.

Figure 4:
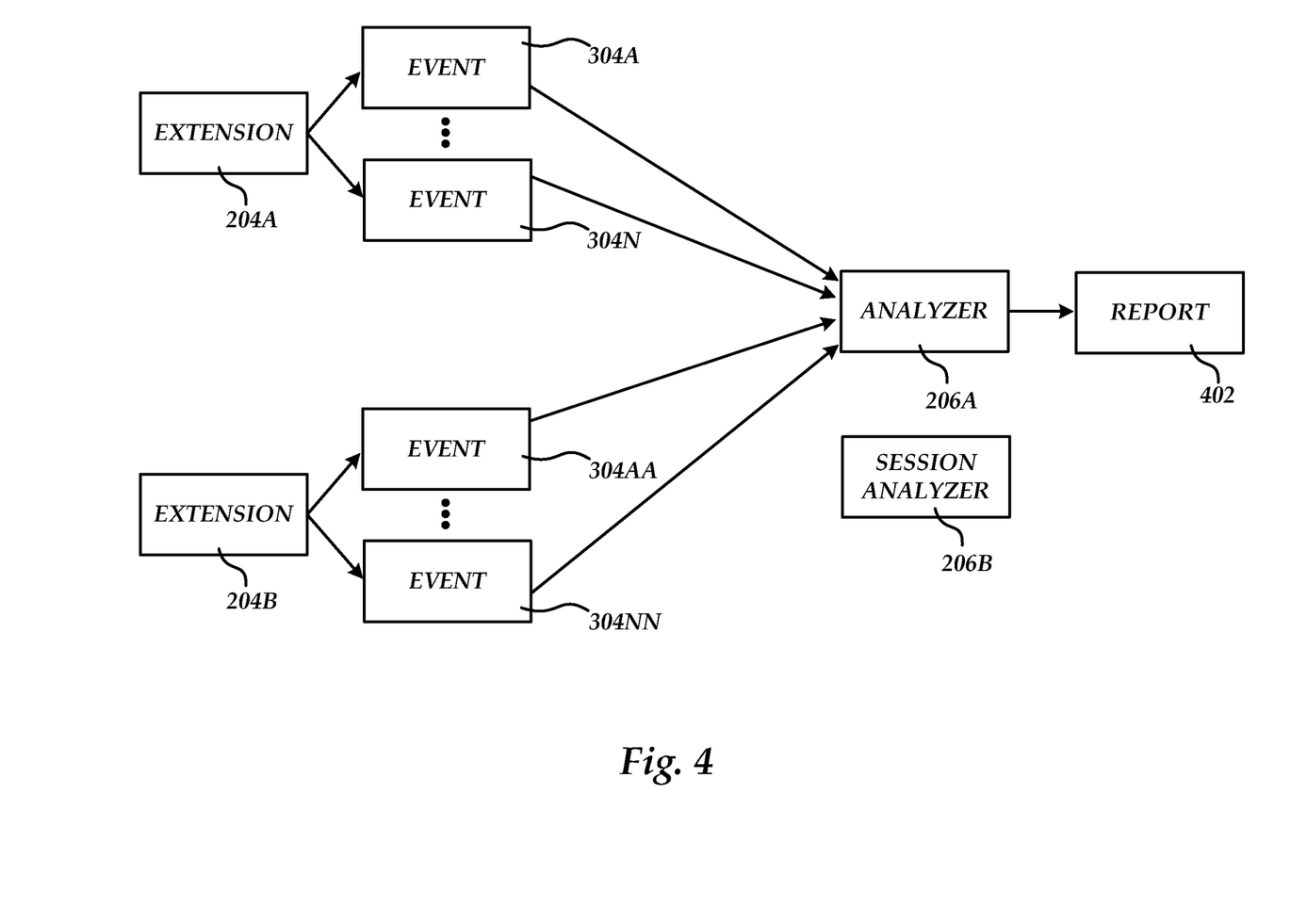
FIG. 4 is a software architecture diagram showing aspects of a log analysis framework analyzer according to one embodiment disclosed herein.

Turning now to FIG. 4, software architecture diagram will be described that shows aspects of the operation of an analyzer 206A according to one embodiment presented herein. As discussed above, the extensions 204A-204B generate the events 304A-304N and 304AA-304NN, respectively. The analyzer 206 is configured to consume the events 304A-304N and 304AA-304NN and to perform a specified analysis on the events. In this regard, it should be appreciated that the analyzer 206A might be programmed to perform virtually any type of analysis on the events 304. For instance, the analyzer 206A might implement a state machine for processing the events. The analyzer 206A might also be programmed in another fashion to answer other types of questions regarding the contents of the log file 106 from which the events 304A-304N and 304AA-304NN were triggered. The results of the analysis performed by the analyzer 206A may be stored in a report 402. As will be described in greater detail below, the report 402 may be made available to other external processes by way of the core 202.

According to one implementation, a session analyzer 206B is also provided. A session analyzer 206B is similar to an analyzer 206A. However, the session analyzer 206B is configured to analyze events 304 corresponding to sessions defined in one or more log files 106. For instance, a particular type of process 104 executing on a server 102 might store events in a log file 106 corresponding to a multitude of sessions maintained by the process. The session analyzer 206B can be configured to analyze session related patterns among the various sessions, such as trends for requests per session, session time life, etc.

It should be appreciated that the analyzers 206 handle the events 304 without concern to how the events were originally represented in a log file 106. Additionally, it should be appreciated that according to one embodiment, the analyzers 206 are executed independently of one another. In this regard, each analyzer 206 may operate without information indicating that other analyzers are running, the number of servers from which the events 304 were generated, the number of log files 106 from which the events 304 were generated, or the like. In this regard, it should be appreciated that a single analyzer 206A can be created that analyzes multiple log types and that processes multiple log types generated by multiple computing systems, such as the server computers 102A-102B.

It should also be appreciated that the extensions 204 may present events to the analyzers 206 in chronological order. For example, the server 102A and server 102B may each generate log files 106A and 106B, respectively. The events defined by the log files 106A and 106B can then be presented to the appropriate analyzers 206 in chronological order depending on the timestamps associated with the events.

As also described briefly above, the analyzers 206 may be compiled at runtime by the framework 112. Because the analyzers 206 are compiled at runtime, it is not necessary to install a development environment on the machine upon which the framework 112 is to be executed. Additionally, because the analyzers 206 are compiled at runtime, modification of an analyzer 206 may be accomplished by editing the source file of the analyzer 206 and placing the modified source file in a location available to the core 202. In this regard, it should be appreciated that modifying an analyzer 206 is similar to the modification of a script file. In this regard, it should be appreciated that an analyzer 206 may be modified using a standard text editor program.

Figure 5:
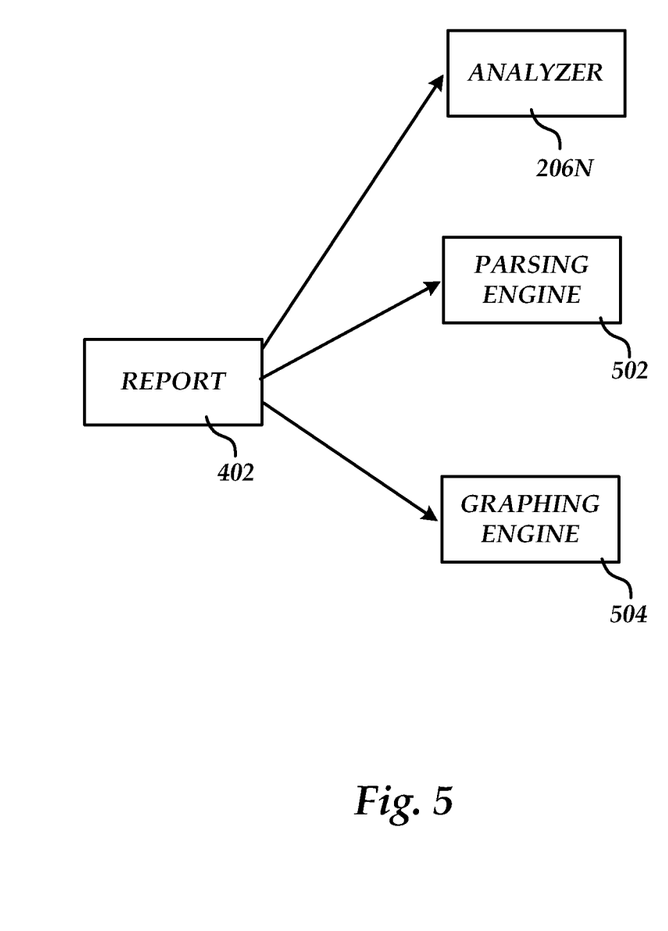
FIG. 5 is a software architecture diagram showing additional aspects regarding the operation of an event-driven log analysis framework provided in one embodiment disclosed herein.

Turning now to FIG. 5, a software architecture diagram will be described that shows additional aspects regarding the operation of the framework 112 according to one embodiment presented herein. As described briefly above, a report 402 generated by an analyzer 206 might be provided to other external software components for further analysis. For instance, according to one implementation, the core 202 is configured to provide report 402 to an external parsing engine 502. For example, the core 202 may provide the report 402 to the LOGPARSER parsing engine. As known in the art, the LOGPARSER parsing engine is a SQL-like engine that provides analysis on well structured data.

Alternatively, or in combination, the core 202 might also provide the report 402 to an external graphing engine 504. For instance, in one implementation, the core 202 may provide the report 402 to the GRAPHVIZ graphing engine. As known in the art, the GRAPHVIZ graphing engine is a tool that renders directed graphs. It should be appreciated that the examples provided herein are merely illustrative and that the core might provide the report 402 to other parsing engines, graphing engines, and other external software components. The core might also provide the report 402 to another analyzer 206N or to another analysis framework.

Figure 6:
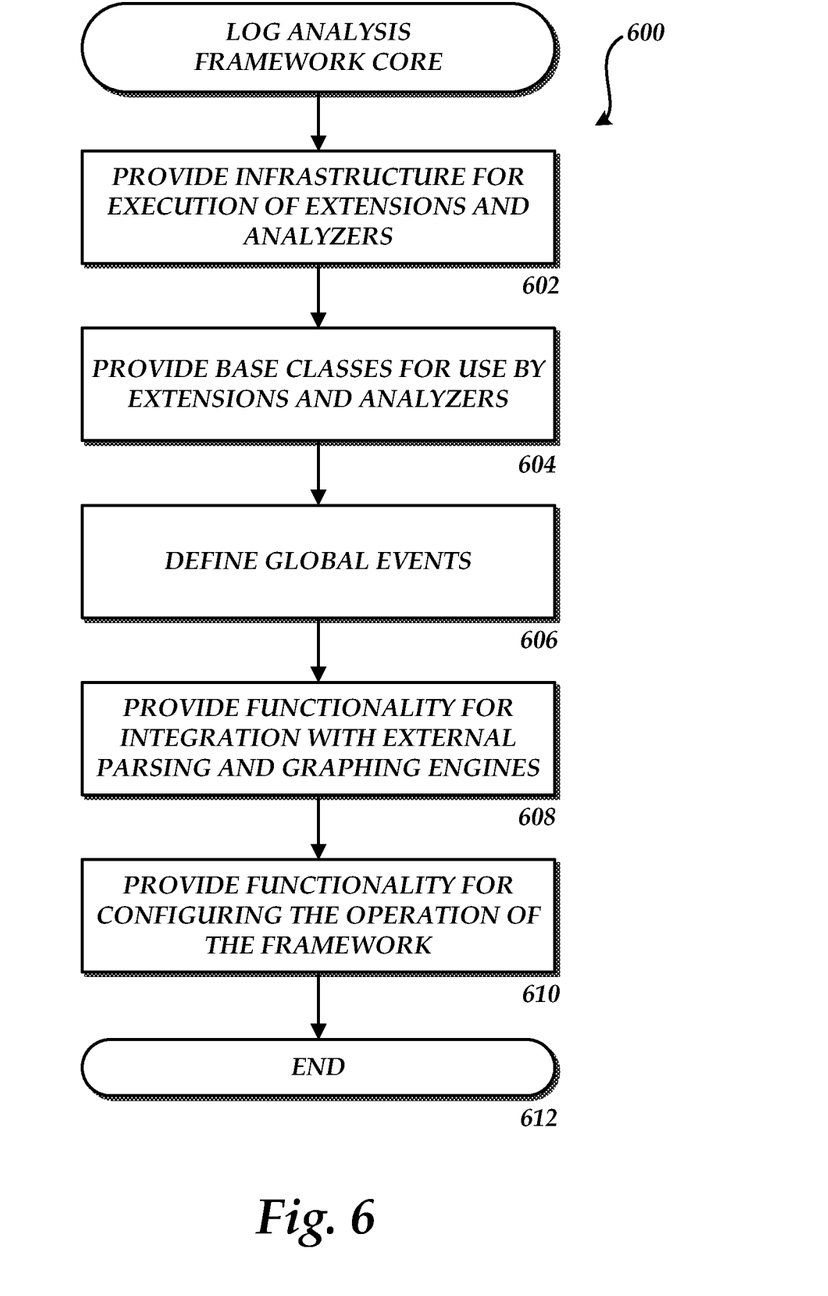
FIG. 6 is a flow diagram illustrating aspects of the operation of a log analysis framework core according to one embodiment disclosed herein.

Turning now to FIG. 6, additional details will be provided regarding the embodiments presented herein for an extensible event-driven log analysis framework. In particular, FIG. 6 is a flow diagram showing a routine 600 that shows aspects of the operation of the core 202 according to one embodiment disclosed herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 600 begins at operation 602, where the core 202 provides an infrastructure for the execution of the extensions 204 and the analyzers 206. As described briefly above, the infrastructure might include base classes for use by the extensions 204 and the analyzers 206, which occurs at operation 604. This also includes defining global events, such as start up, shut down, time change, log line, and others, which occurs at operation 606.

From operation 606, the routine 600 proceeds to operation 608 where the core 202 provides functionality for integration with external parsing and graphing engines, such as the parsing engine 502 and the graphing engine 504. As discussed above, the core 202 might provide functionality for providing a report 402 generated by an analyzer 206 to one or more parsing engines 502 and graphing engines 504 in parallel or in series. The core 202 might also provide functionality for providing a report 402 to other types of external software components.

From operation 608, the routine 600 proceeds to operation 610 where the core 202 provides functionality for configuring the operation of the framework 112. In this regard, an appropriate command line or graphical user interface might be provided to a user of the framework 112 to configure its operation. According to embodiments, functionality might be provided for configuring the operation of the core 202 as well as extension and analyzer specific behavior. From operation 610, the routine 600 proceeds to operation 612, where it ends.

Figure 7:
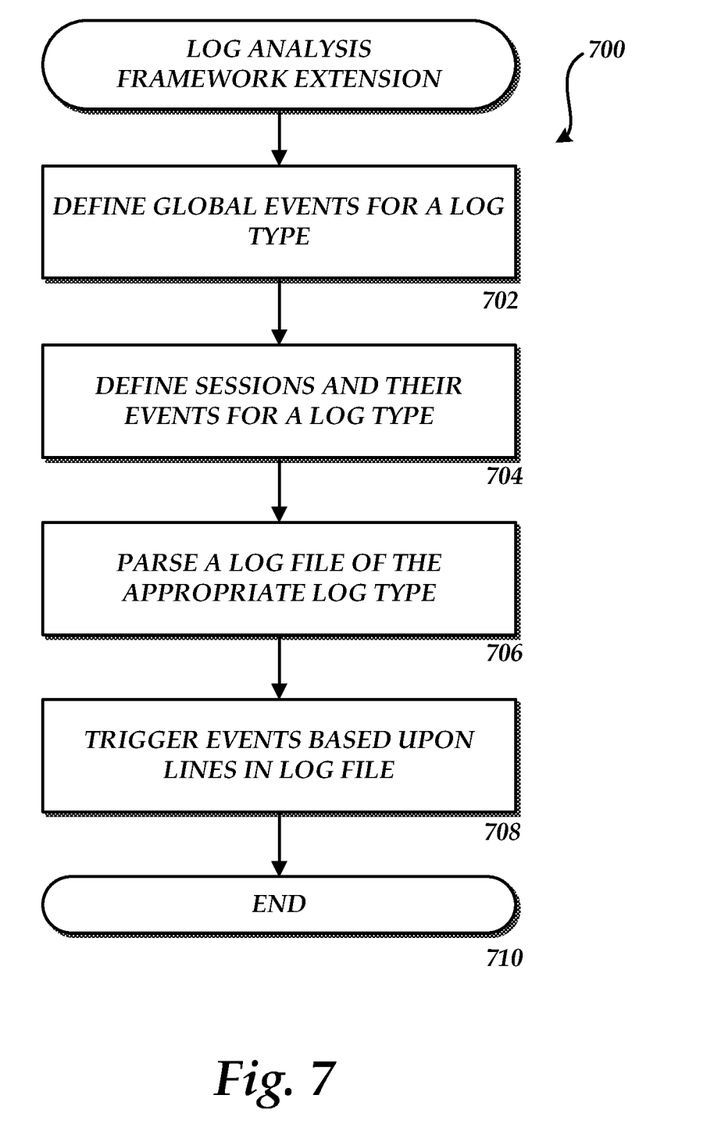
FIG. 7 is a flow diagram illustrating aspects of the operation of a log analysis framework extension according to one embodiment disclosed herein.

Turning now to FIG. 7, an illustrative routine 700 will be described that illustrates aspects regarding the operation of the extensions 204. The routine 700 begins at operation 702, where a particular extension defines global events for a particular type of log file 106. For instance, in the case of a log file 106 that contains data regarding the operation of a service, the extension 204 might define global events including events indicating that a service has been started, that the service has been shut down, and that other actions have been taken with regard to the service.

From operation 702, the routine 700 proceeds to operation 704 where the extension 204 might define sessions and events associated with a session for a particular type of log file 106. For instance, session events might comprise events indicating that a session has been established, a session has been closed, and other types of session related events. From operation 704, the routine 700 proceeds to operation 706.

At operation 706, an extension 204 is executed to thereby parse a log file 106 of an appropriate type. As discussed above, an extension 204 parses the lines 302 contained in the log file 106 and triggers appropriate events 304 based on the contents of the log file. Each of the events 304 may have zero or more arguments more particularly describing the log line 302. This occurs at operation 708. Once the extension 204 has completed analysis of the particular log file 106, the routine 700 proceeds to operation 710, where it ends.

Figure 8:
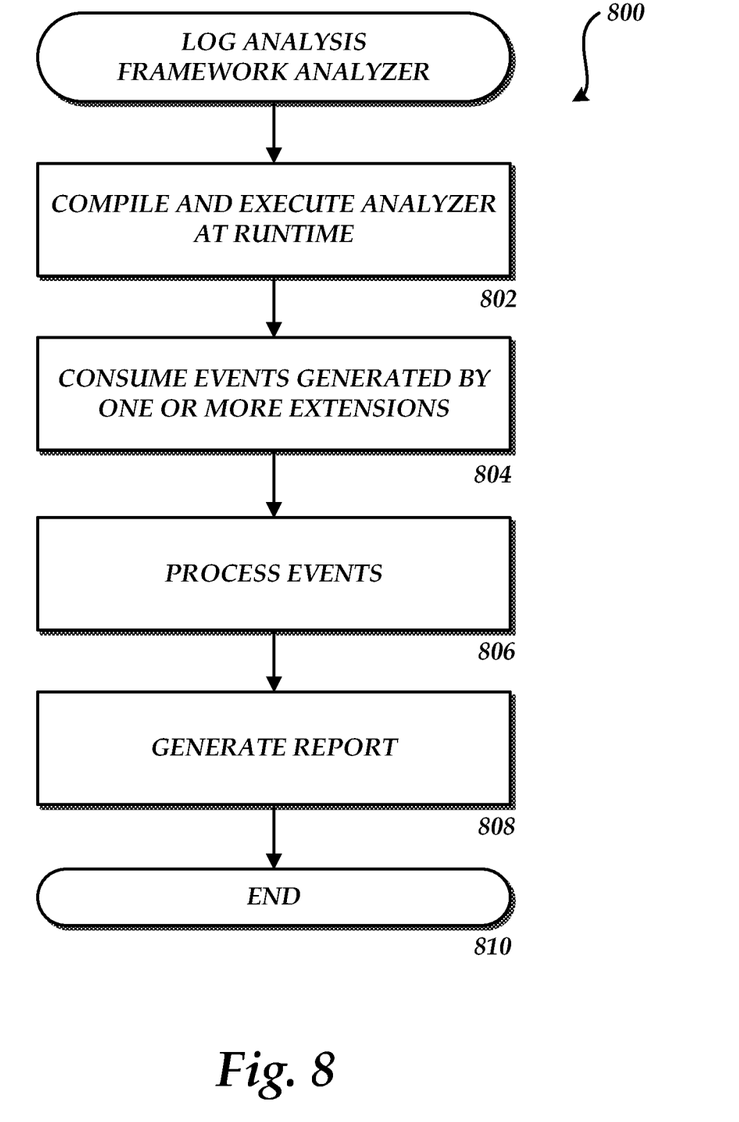
FIG. 8 is a flow diagram illustrating aspects of the operation of a log analysis framework analyzer according to one embodiment disclosed herein.

Referring now to FIG. 8, an illustrative routine 800 will be described illustrating aspects of the operation of an analyzer 206 according to one embodiment presented herein. The routine 800 begins at operation 802 where the analyzer 206 is compiled and executed at runtime. As discussed above, by compiling and executing an analyzer 206 at runtime, modification of an analyzer 206 can be performed without requiring manual recompilation of the analyzer 206.

Once the analyzer 206 has been executed, the analyzer 206 consumes the events 304 generated by one or more extensions 204. In response to the events 304, the analyzer 206 performs processing at 806 in the specified manner. As discussed above, because the analyzer 206 can be created using an object-oriented programming language or another type of suitable programming language capable of receiving the events 304, virtually any type of processing can be performed on the events 304. Moreover, it should be appreciated that since the extensions 204 were responsible for parsing the log file 106, the operation of the analyzers 206 can be limited to processing the events generated by the extensions 204. This also gives the benefit that changes in the format of a log file may require changes to an extension but typically do not require changes to already developed analyzers.

When processing has completed, the routine 800 proceeds to operation 808 where the analyzer 206 generates a report 402 that indicates the results of the processing performed by the analyzer 206. As discussed above, the core 202 might then be utilized to provide the report 402 to an external parsing engine 502 or a graphing engine 504. From operation 808, the routine 800 proceeds to operation 810, where it ends.

It should be appreciated that, according to one implementation, the log files 106 that are consumed by the extensions 204 might be log files that have been previously stored prior to the execution of the extension 204. Alternatively, in another embodiment, the log files 106 might be processed in real time by the extensions 204. For instance, an event might be triggered indicating to an extension 204 that a new line has been added to a log file 106. In response thereto, an extension 204 might parse the newly added line and generate an appropriate event 304. It should be appreciated that other configurations might also be utilized for processing the contents of the log files in real or non-real time.

It should also be appreciated that although the embodiments disclosed herein have been presented in the context of log files, the source of the raw data consumed by the extensions might be another type of data. For example, according to other embodiments, the extensions might consume data from a database, system event logs, or another type of data source. It is the job of the extension to translated data from such source into events. The core has no dependency on "log files" since it doesn't really have to deal directly with them.

It should also be appreciated that the framework presented herein can be executed as a standalone tool or hosted within an application program. For example, in a first scenario the framework is hosted within test cases to test the logging functionality. In another scenario, an application hosts the framework in order to perform real-time analysis of entries in a log file as they are being generated.

Figure 9:
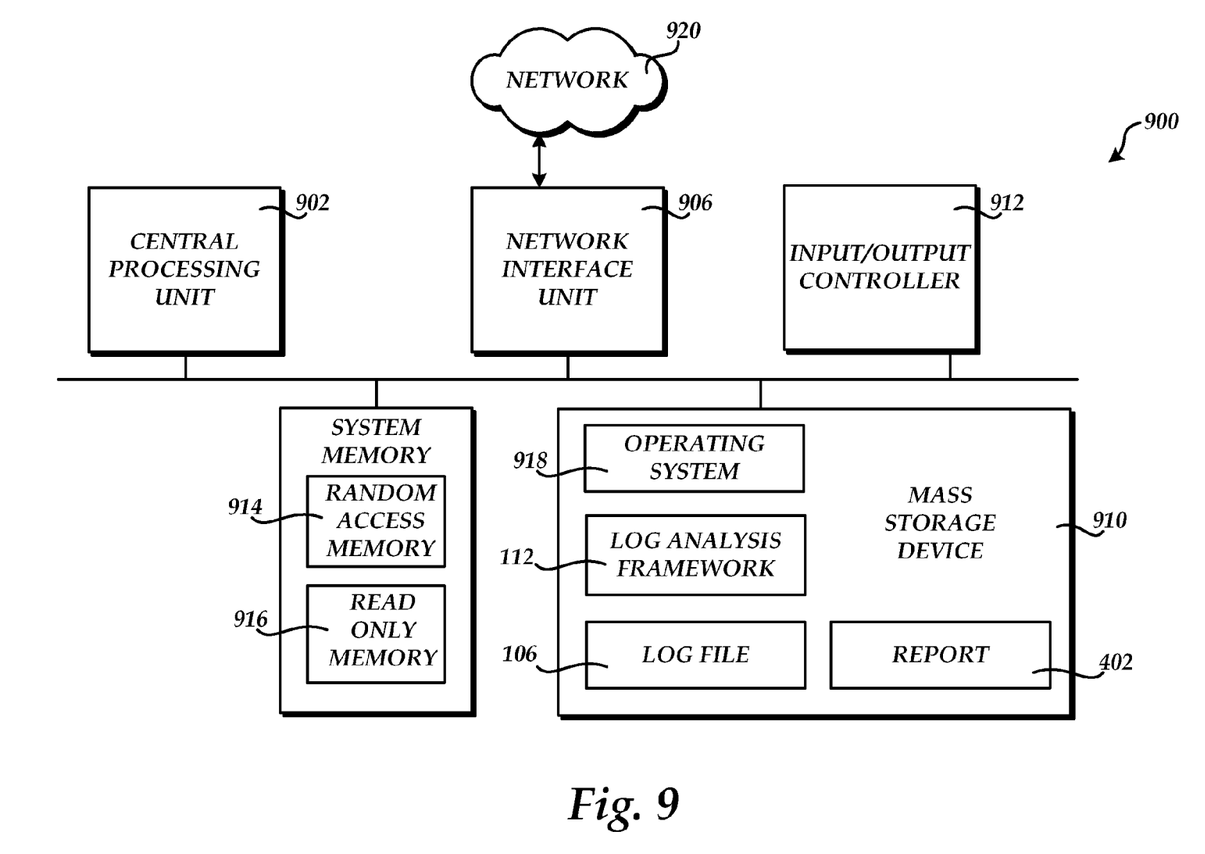
FIG. 9 is a computer architecture diagram showing an illustrative computer hardware and software architecture for a computing system capable of implementing the embodiments presented herein.

FIG. 9 shows an illustrative computer architecture for a computer 900 capable of executing the software components described herein for providing an extensible event-driven log analysis framework. The computer architecture shown in FIG. 9 illustrates a conventional desktop, laptop computer, or server computer and may be utilized to execute the core 202, the extensions 204, the analyzers 206, or any of the other software components described herein.

The computer architecture shown in FIG. 9 includes a central processing unit 902 ("CPU"), a system memory 908, including a random access memory 914 ("RAM") and a read-only memory ("ROM") 916, and a system bus 904 that couples the memory to the CPU 902. A basic input/output system ("BIOS") containing the basic routines that help to transfer information between elements within the computer 900, such as during startup, is stored in the ROM 916. The computer 900 further includes a mass storage device 910 for storing an operating system 918, application programs, and other program modules, which will be described in greater detail below.

The mass storage device 910 is connected to the CPU 902 through a mass storage controller (not shown) connected to the bus 904. The mass storage device 910 and its associated computer-readable media provide non-volatile storage for the computer 900. Although the description of computer-readable media contained herein refers to a mass storage device, such as a hard disk or CD-ROM drive, it should be appreciated by those skilled in the art that computer-readable storage media can be any available computer storage media that can be accessed by the computer 900.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 900. As used herein, the term computer-readable storage media does not encompass transitory signals.

According to various embodiments, the computer 900 may operate in a networked environment using logical connections to remote computers through a network such as the network 920. The computer 900 may connect to the network 920 through a network interface unit 906 connected to the bus 904. It should be appreciated that the network interface unit 906 may also be utilized to connect to other types of networks and remote computer systems. The computer 900 may also include an input/output controller 912 for receiving and processing input from a number of other devices, including a keyboard, mouse, or electronic stylus (not shown in FIG. 9). Similarly, an input/output controller may provide output to a display screen, a printer, or other type of output device (also not shown in FIG. 9).

As mentioned briefly above, a number of program modules and data files may be stored in the mass storage device 910 and RAM 914 of the computer 900, including an operating system 918 suitable for controlling the operation of a networked desktop, laptop, or server computer. The mass storage device 910 and RAM 914 may also store one or more program modules. In particular, the mass storage device 910 and the RAM 914 may store the framework 112, including the core 202, the extensions 204, and the analyzers 206, and the other program modules described above. The mass storage device 910 and RAM 914 may also store other program modules and data.

In general, software applications or modules may, when loaded into the CPU 902 and executed, transform the CPU 902 and the overall computer 900 from a general-purpose computing system into a special-purpose computing system customized to perform the functionality presented herein. The CPU 902 may be constructed from any number of transistors or other discrete circuit elements, which may individually or collectively assume any number of states. More specifically, the CPU 902 may operate as one or more finite-state machines, in response to executable instructions contained within the software or modules. These computer-executable instructions may transform the CPU 902 by specifying how the CPU 902 transitions between states, thereby physically transforming the transistors or other discrete hardware elements constituting the CPU 902.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for providing an extensible event-driven log analysis framework have been disclosed herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and storage mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing a log analysis framework, the method comprising performing computer implemented operations for:
    executing a log analysis framework extension, the log analysis framework extension configured to parse a log file and to trigger one or more events based upon the contents of the log file;
    compiling a log analysis framework analyzer at a runtime of the log analysis framework analyzer;
    providing a log analysis framework core configured to support the execution of the analysis framework extension and the log analysis framework analyzer; and
    executing the log analysis framework analyzer, the log analysis framework analyzer configured to consume the events triggered by the log analysis framework extension and to generate one or more reports based upon the events.

2. The computer-implemented method of claim 1, further comprising providing one log analysis framework extension per type of log file.

3. The computer-implemented method of claim 1, further comprising providing a plurality of analyzers per extension.

4. The computer-implemented method of claim 2, further comprising providing the report to a graphing engine.

5. The computer-implemented method of claim 2, further comprising providing the report to a parsing engine, to another analyzer, or to another analysis framework.

6. The computer-implemented method of claim 5, wherein the framework can be executed as a standalone tool or hosted within an application program.

7. The computer-implemented method of claim 1, wherein the log analysis framework core is configured to detect the log analysis framework extensions at a runtime of the log analysis framework core.

8. The computer-implemented method of claim 7, wherein the log analysis framework analyzer is configured to process one or more log files generated by a plurality of computing systems and wherein events are triggered from the one or more log files in chronological order.

9. The computer-implemented method of claim 8, wherein the log analysis framework analyzer is configured to process a plurality of log file types.

10. A computer-readable storage medium having computer-executable instructions stored thereupon which, when executed by a computer, cause the computer to:
    execute a log analysis framework core, the log analysis framework core configured to support the execution of one or more log analysis framework extensions and one or more log analysis framework analyzers;
    execute a log analysis framework extension, the log analysis framework extension configured to parse a log file and to trigger one or more events based upon the contents of the log file;
    compile a log analysis framework analyzer at a runtime of the log analysis framework analyzer;
    provide a log analysis framework core configured to support the execution of the analysis framework extension and the log analysis framework analyzer; and to
    execute a log analysis framework analyzer, the log analysis framework analyzer configured to consume the events triggered by the log analysis framework extension and to generate a report based upon the events.

11. The computer-readable medium of claim 10, wherein the log analysis framework analyzer is configured to process one or more log files generated by a plurality of computing systems.

12. The computer-readable medium of claim 10, wherein the log analysis framework analyzer is configured to process a plurality of log file types.

13. The computer-readable storage medium of claim 12, wherein the events comprise one or more arguments.

14. The computer-readable storage medium of claim 13, having further computer-executable instructions stored thereupon which, when executed by the computer, will cause the computer to provide the report to a graphing engine or a parsing engine.

15. A computer-implemented method for providing an extensible event-driven log analysis framework, the method comprising performing computer-implemented operations for:
- providing a log analysis framework core configured to support the execution of one or more log analysis framework extensions and one or more log analysis framework analyzers;
- executing a log analysis framework extension configured to parse a log file and to trigger one or more events based upon the contents of the log file;
- compiling a log analysis framework analyzer at a run time of the log analysis framework analyzer; and
- executing the compiled log analysis framework analyzer to consume the events triggered by the log analysis framework extension and to generate a report based upon the events.

16. The computer-implemented method of claim 15, wherein the log analysis framework analyzer is configured to process one or more log files generated by a plurality of computing systems and to process a plurality of log file types.

17. The computer-implemented method of claim 16, wherein the log analysis framework core is configured to detect the log analysis framework extensions at a runtime of the log analysis framework core.

* * * * *